March 18, 1952     H. O. LEE     2,589,714
ELECTRICAL WATER GAUGE
Filed May 5, 1949
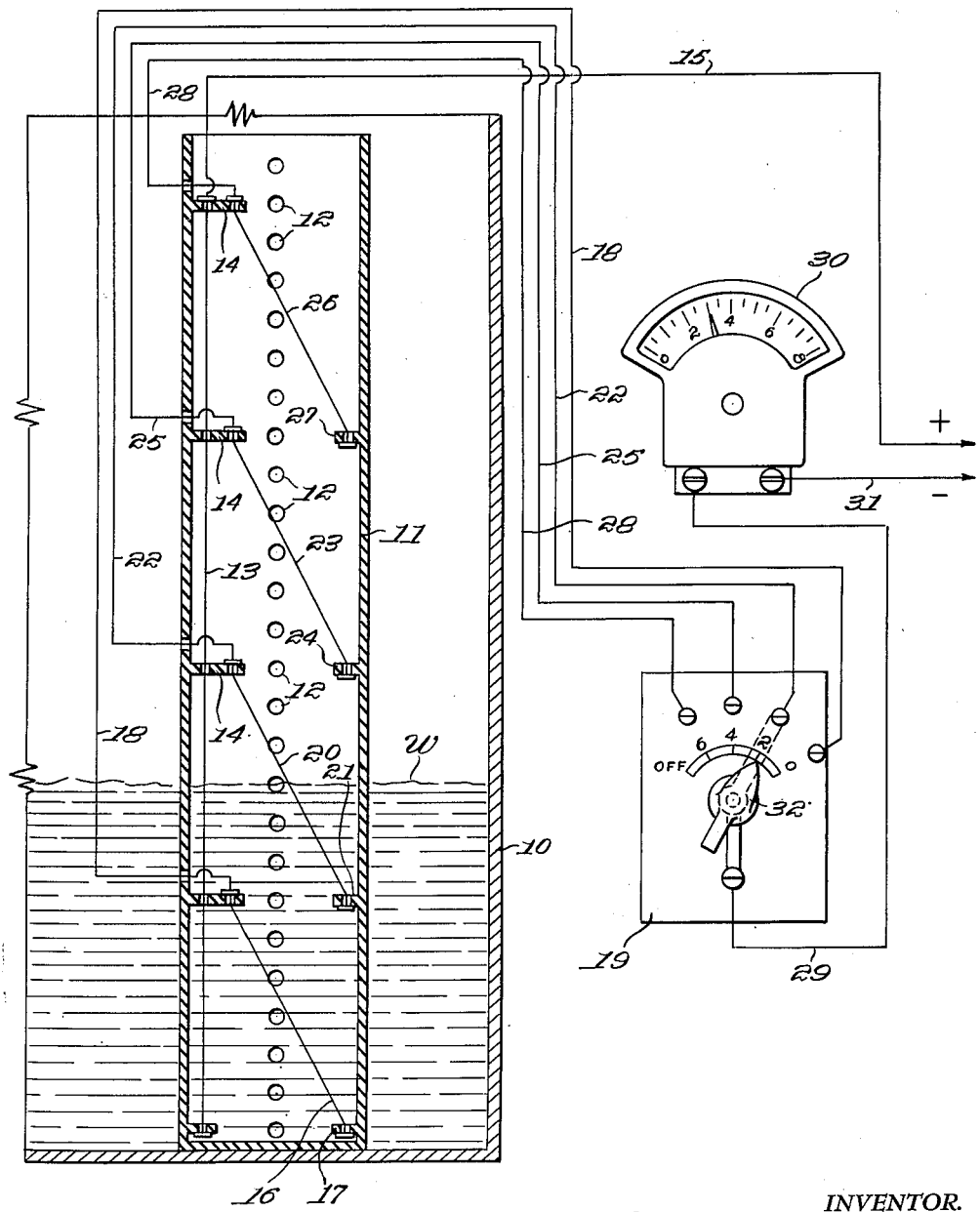
INVENTOR.
Hilliard O. Lee,
BY Victor J. Evans & Co.
ATTORNEYS Patented Mar. 18, 1952

2,589,714

UNITED STATES PATENT OFFICE 2,589,714

ELECTRICAL WATER GAUGE

Hilliard O. Lee, Kansas City, Kans.

Application May 5, 1949, Serial No. 91,473

1 Claim. (Cl. 73—304)

This invention relates to a fluid level indicator, and more particularly to an electrically controlled indicator.

The object of the invention is to provide an electrical gauge or indicator which will enable the user to accurately ascertain the level of liquid in ponds, pumps, or tanks.

Another object of the invention is to provide an electrical indicator which will operate on a minimum of current consumption to measure the current capacity of water in a pond, tank, or the like, and which will accurately indicate the exact depth of the liquid.

A further object of the invention is to provide an electrical water gauge which is extremely simple and inexpensive to manufacture.

Other objects and advantages will be apparent during the course of the following description.

The figure of the drawing is a diagrammatic view of the fluid level indicator, according to the present invention.

Referring in detail to the drawings, the numeral 10 designates a tank or container for holding fluid, such as water W therein. The present invention is directed to a gauge or indicator for measuring the depth of water in the container 10, and it is to be understood that the device can also be used for measuring the depth of water in ponds, lakes, and the like.

The indicator of the present invention includes a housing 11 which is fabricated of a material non-conductive of electricity and the housing 11 is immersed in the body of water W. The housing 11 includes a plurality of vertically spaced openings or holes 12 for the ingress therethrough of water. A positive electrode 13 extends longitudinally through the housing 11 and the electrode 13 is supported by a plurality of insulated cleats 14. A suitable line 15 electrically connects the positive electrode 13 to a source of electrical energy.

A first negative electrode 16 has its lower end connected to an insulated cleat 17, and the upper end of the electrode 16 is supported by the lowermost of the insulated cleats 14.

A line 18 electrically connects the electrode 16 to a terminal marked Zero (0) on a manually operable selector switch 19. Arranged above the negative electrode 16 is a second negative electrode 20 which has its lower end supported by the cleat 21 which projects from or is secured to the interior of the housing 11. The upper end of the electrode 20 is supported by the proper insulated cleat 14, and a line 22 electrically connects the electrode 20 to the terminal marked Two (2) on the selector switch 19. A third negative electrode 23 has its lower end supported by an insulated cleat 24, and a line 25 electrically connects the upper end of the electrode 23 to the terminal marked Four (4) on the selector switch 19. Finally, a fourth negative electrode 26 has its lower end supported by the insulated cleat 27, while the upper end of the electrode 26 is supported by the uppermost of the cleats 14, there being a line 28 electrically connecting the electrode 26 to the terminal or contact marked or indicated by the numeral Six (6) on the selector switch 19.

A line 29 electrically connects the common terminal of the selector switch 19 to one of the contacts or terminals of an ammeter 30, the ammeter being graduated to read in milliamps, while a line 31 electrically connects ammeter 30 to a suitable source of electrical energy.

The operation of the water gauge indicator is as follows:

The depth selector switch 19 is normally maintained in the off position, or in other words, the movable contact 32 is at the extreme left position, which is indicated by the word off. Assume that there is two and a half feet of water in the pond or tank 10. Then, the movable contact 32 of the depth selector switch 19 is moved from the Off position to the position or contact indicated by the numeral 6, the movable contact 32 being pivoted or moved in a clockwise direction. This movement of the contact 32 to the position marked 6 energizes the line 28 and consequently energizes the upper negative electrode 26. The ammeter 30 will remain at Zero (0) or will not register because the water level is below the lower end of electrode 26 which is exactly six feet from the bottom of the reservoir. Next, the movable contact 32 is moved in a clockwise direction to the position or contact indicated by the numeral 4 to thereby energize the electrode 23. The ammeter 30 will still remain at Zero (0), because the water is below the lower end of electrode 23 which is exactly four feet above the bottom of the reservoir and is not contacted by the water. Then, the movable contact 32 is moved to the number 2 position which energizes the line 22 and the electrode 20 and now, the meter 30 registers because the lower end of electrode 20 is in contact with the water. The user knows that there is two feet of water in the tank or pond because the lower end of the electrode 20 is exactly two feet above the bottom of the tank 10, and the meter 30 is calibrated to register the additional depth in inches above the lower end of electrode 20. Thus, the numbers on the selector switch 19 indicate the depth of water in feet, while the meter 30 indicates the depth in inches.

This arrangement of the electrodes and switch, enables the user to measure water of any depth, and the measurement is accomplished with a minimum current consumption due to the fact that only one negative electrode can be energized at any one time. The gauge measures only the conductivity of the water in the area between one negative electrode and the positive electrode.

The numbers on the switch 19 indicate the depth of water in feet and are placed on the switch in inverse succession for clockwise operation of the switch so that the upper electrode 26 is energized first, and then the electrode therebelow is energized until the water level is located. When the ammeter 30 is first energized or registers, movement of the contact 32 is stopped, and the number that the switch contact or pointer 32 is set on is observed. This number on the switch 19 indicates in feet the depth of the water, and by observing the ammeter 30, the additional depth in inches is measured or indicated, and the depth in inches is added to the number on the selector 19 whereby the user has a correct reading of the depth of water in the container or pond. The bare electrodes in the housing 11 are in contact with the water so that the meter 30 registers with the slightest rise or fall of the water level. Thus, as the water rises around the electrodes, the resistance of the water decreases between the electrodes to thereby increase the conductance capacity between the electrodes. In other words, the gauge of the present invention measures the water between the positive and negative electrodes. All of the conductor wires between the switch 19 and the housing 11 preferably enter the housing through the top and porcelain tubes may be provided for maintaining the lines in proper spaced relation. Further, various arrangements of electrodes can be used, and by a proper arrangement of the electrodes and switch, water of any depth can be measured.

It will be understood that although this device is designed for use on a water reservoir, it may also be used on moving vehicles such as water tanks of railroad locomotives and the housing eliminates the effect of splashing when used on same.

While I have shown and described a preferred embodiment of my invention, this is by way of illustration only, and I consider as my own all such modifications in construction as fairly falls within the scope of the appended claim.

What I claim:

In a liquid level indicator, an insulated housing adapted to be immersed in a body of water, there being a plurality of vertically spaced openings in said housing for the ingress therethrough of water, a positive electrode extending longitudinally through said housing and connected to a source of electrical energy, a plurality of vertically spaced negative electrodes supported in said housing, a manually operable selector switch electrically connected to said negative electrodes, an ammeter electrically connected to said selector switch, said selector switch being graduated to indicate the depth of water in feet and the ammeter being graduated to indicate the depth of water in fractions of a foot.

HILLIARD O. LEE.

REFERENCES CITED

The following references are of record in the file of this patent:

UNITED STATES PATENTS

| Number | Name | Date |
|---|---|---|
| 829,161 | Kjerulff | Aug. 21, 1906 |
| 1,831,898 | Wignall | Nov. 17, 1931 |
| 2,289,202 | McCoy | July 7, 1942 |
| 2,456,617 | Burch | Dec. 21, 1948 |

FOREIGN PATENTS

| Number | Country | Date |
|---|---|---|
| 506,580 | Great Britain | June 1, 1939 |